(12) United States Patent
Bennett

(10) Patent No.: US 7,225,286 B2
(45) Date of Patent: May 29, 2007

(54) METHOD TO MEASURE TRANSMISSION DELAY BETWEEN 1394 BRIDGES

(75) Inventor: Jeff Bennett, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 17 days.

(21) Appl. No.: 10/179,317

(22) Filed: Jun. 24, 2002

(65) Prior Publication Data

US 2003/0236938 A1 Dec. 25, 2003

(51) Int. Cl.
*G06F 13/38* (2006.01)
*H04L 12/26* (2006.01)
*H04L 12/40* (2006.01)
*G06F 13/40* (2006.01)

(52) U.S. Cl. ............ 710/305; 710/306; 710/313; 370/252; 370/257

(58) Field of Classification Search ........ 710/305–306, 710/313, 58; 713/100, 500; 370/252, 257
See application file for complete search history.

(56) References Cited

U.S. PATENT DOCUMENTS

| | | | | |
|---|---|---|---|---|
| 5,991,304 | A  * | 11/1999 | Abramson ................... | 370/413 |
| 6,212,171 | B1 * | 4/2001 | LaFollette et al. .......... | 370/257 |
| 6,289,406 | B1 * | 9/2001 | Chambers et al. .......... | 710/107 |
| 6,321,264 | B1 * | 11/2001 | Fletcher et al. ............. | 709/224 |
| 6,385,679 | B1 * | 5/2002 | Duckwall et al. ........... | 710/119 |
| 6,728,809 | B1 * | 4/2004 | Suzuki et al. ................ | 710/118 |
| 6,959,017 | B2 * | 10/2005 | Nakai et al. ................. | 370/517 |
| 7,035,214 | B1 * | 4/2006 | Seddigh et al. ............. | 370/231 |
| 2002/0024973 | A1 * | 2/2002 | Tavana et al. .............. | 370/508 |
| 2002/0064185 | A1 * | 5/2002 | Nakai et al. ................. | 370/519 |
| 2002/0105977 | A1 * | 8/2002 | Masunaga et al. .......... | 370/519 |
| 2002/0176436 | A1 * | 11/2002 | Salloum Salazar .......... | 370/431 |

FOREIGN PATENT DOCUMENTS

EP 0938218 A2 8/1999

OTHER PUBLICATIONS

Anderson, Don; "FireWire System Architecture";MindShare Inc.; 1998; First Printing; pp. 253-259 and 323-330.*
"P1394b Draft Standard for a High Performance Serial Bus (Supplement)"; IEEE; Draft 1.07; Mar. 13, 2001; pp. 21, 34, 231-241.*
IEEE Standard 1394A "A Standard for a High-Performance Serial Bus", by Julian C. Dunn et al.
IEEE 1394/A—"An Innovative Industrial High-Performance Serial Bus Standard", by Burke Henehan et al.
P1394A Long Distance Support.

* cited by examiner

*Primary Examiner*—Paul R. Myers
*Assistant Examiner*—Ryan Stiglic
(74) *Attorney, Agent, or Firm*—Larry Liberchuk

(57) ABSTRACT

In lieu of a strictly dedicated bus transaction such as a ping and self-identification, the timing delays for an IEEE 1394 serial bus are determined by an asynchronous transaction request and responsive acknowledgement response. Timing may therefore be determined either from asynchronous transactions occurring for other purposes (e.g., a read or write) or initiated for the purpose of determining timing.

21 Claims, 2 Drawing Sheets

METHOD TO MEASURE TRANSMISSION DELAY BETWEEN 1394 BRIDGES

TECHNICAL FIELD OF THE INVENTION

The present invention is directed, in general, to serial bus timing and, more specifically, to determining bus delays associated with data communications over a IEEE 1394 serial bus.

BACKGROUND OF THE INVENTION

The Institute for Electrical and Electronic Engineers (IEEE) standard 1394 (often referred to as "FireWire") is a serial bus standard developed as an inexpensive alternative to parallel buses, which are confined to a small physical area, do not have plug-and-play support, and do not support isochronous applications. The standard is similar to the Universal Serial Bus (USB) standard available in most contemporary personal computers in that many devices connected via USB could alternatively be connected via IEEE 1394. If supported, IEEE 1394 could increase transfer rates, supporting transfer speeds up to 400 mega-bits per second (Mb/s) or greater for devices such as hard disk drives, motion video recorders, sound mixers and the like. Other advantageous features, such as a 16 exabyte theoretical address space, connection of up to 1024 buses each with as many as 64 devices to single computer, and support of scalability mechanisms such as hot-swapping and auto-detection or auto-discovery of connected/disconnected devices, make IEEE 1394 a versatile standard.

In order to use longer cables than specified by the standard, or to permit physical layers to have longer delays (e.g., arbitration gap delays) than the maximums allowed by the physical layer, a timing mechanism is required for determining, for instance, the bus arbitration gap count. There is, therefore, a need in the art for an accurate timing mechanism for evaluating IEEE 1394 bus delays.

SUMMARY OF THE INVENTION

To address the above-discussed deficiencies of the prior art, it is a primary object of the present invention to provide, for use in timing determinations for IEEE 1394.1 systems or networks, determination of the timing delays from an asynchronous transaction request and responsive acknowledgement response in lieu of a strictly dedicated bus transaction such as a ping and self-identification. Timing may therefore be determined either from asynchronous transactions occurring for other purposes (e.g., a read or write) or initiated for the purpose of determining timing.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
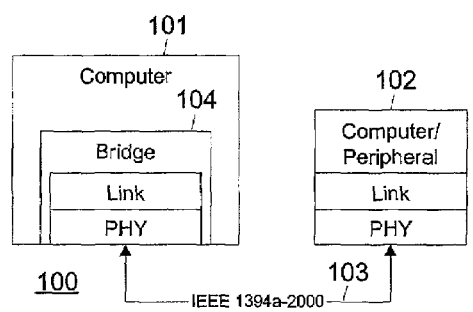
FIG. 1 depicts a data processing system and/or network including a serial bus on which transmission delays are determined according to one embodiment of the present invention.
Figure 2:
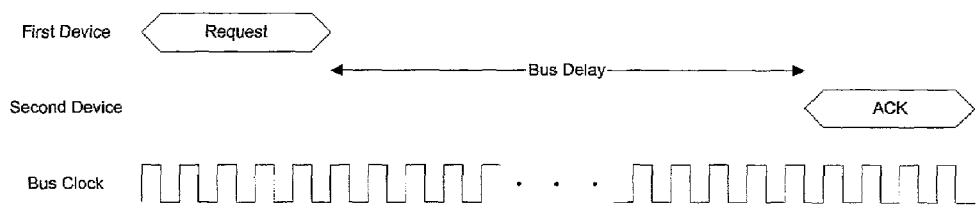
FIG. 2 is a timing diagram illustrating determination of serial bus transmission delay in a data processing system and/or network according to one embodiment of the present invention.
Figure 3:
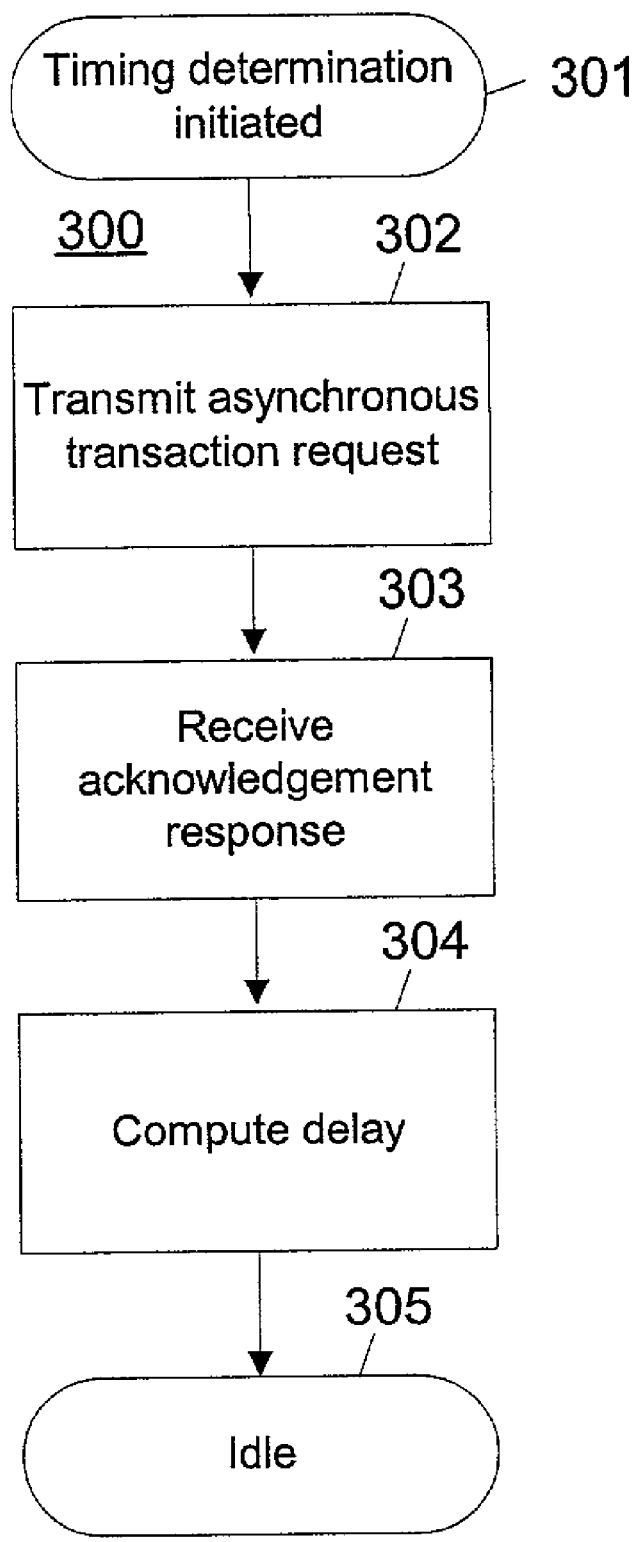
FIG. 3 is a high level flowchart for a process of determining serial bus transmission delay in data processing system and/or network according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a data processing system and/or network including a serial bus on which transmission delays are determined according to one embodiment of the present invention. Data processing system 100 includes a first device 101, such as a personal computer or the like, and a second device 102, which may be another computer or a peripheral such as an external hard disk drive or compact disk read/write drive, a digital camera, or the like. Devices 101 and 102 are communicatively coupled by a serial bus 103 that generally conforms to the IEEE 1394a-2000 standard. Optionally, device 101 (or device 102) may include a bridge controller 104 for enabling device 101 to communicate over another IEEE-1394a-2000 bus (not shown). Each device 101 and 102 includes both physical (PHY) and link (LINK) layers according to the IEEE-1394a-2000 standard. Bridge controller 104 within device 101 may also include separate and independently-operating physical and link layers coupled by routing and glue logic for communication over both bus 103 and the other IEEE-1394a-2000 bus described above.

Those skilled in the art will recognize that the complete construction and operation of data processing system 100 is not depicted in the drawings or described herein. Instead, only so much of the system as is unique to the present invention or necessary for an understanding of the present invention is depicted and described herein. The remainder of the system may be constructed and operate in accordance with the known art.

In addition, although shown in the drawings as being directly connected, devices 101 and 102 may alternatively be connected through one or more intermediate nodes coupled to serial bus 103.

Devices 101 and 102 communicate via serial bus 103. One proposed technique for determining transmission delays for communications over bus 103 involves having the bridge controller 104 within device 101 issue a physical layer "ping" packet that commands the physical layer of device 102 to respond with a self-identification (SID) packet. The link layer within the bridge controller 104 then times the length of time during which bus 103 remains idle—that is, the delay from when the transition-to-data-end of the ping packet is sent until the transition-to-beginning-of-data prefix of the self-identification response packet. This information allows determination of the worst-case timing for a transmission channel in order to set gap counts to optimize the bus 103.

In the present invention, rather than employing a ping packet and self-identification response, an asynchronous transaction request and the acknowledgement (ACK) response are employed. The delay from transmission of the transition-to-data-end of the asynchronous transaction request until receipt of the transition-to-beginning-of-data prefix of the responsive acknowledgement packet is measured to determine the serial bus transmission delay. If the asynchronous transaction request is transmitted solely for the purpose of determining timing delays, a read request is preferably employed since write requests may produce undesirable side-effects. However, in the present invention, bus cycles need not be employed solely to determine bus timing as with the proposed ping method. The timing delay may be determined in the present invention in connection with any asynchronous (e.g., read or write) transaction. In addition, timing may optionally be routinely determined with each asynchronous transaction.

The timing technique of the present invention need not be exclusive of the ping method described above. Instead, timing may be routinely determined from asynchronous transactions whenever they occur, with the ping method being employed to determine timing delays during extended intervals of a predetermined length in which no asynchronous transaction occurs. In this manner, timing delays may be determined on a regular basis utilizing asynchronous transactions on an opportunistic basis and utilizing pinging when necessary.

FIG. 2 is a timing diagram illustrating determination of serial bus transmission delay in data processing system and/or network according to one embodiment of the present invention. The delay from transmission of an asynchronous transaction request from a first device to receipt of an acknowledgement response from a second device may be readily measured by logic within the link layer of the first device.

FIG. 3 is a high level flowchart for a process of determining serial bus transmission delay in data processing system and/or network according to one embodiment of the present invention. The process 300 begins with a timing determination being initiated (step 301). An asynchronous transaction request (e.g., read or write) is transmitted (step 302). Upon receipt of a responsive acknowledgement packet (step 303), the elapsed interval is determined (step 304). The process then becomes idle until another timing determination is initiated.

As noted above, timing delays may be determined on an opportunistic basis whenever asynchronous transactions occur. Accordingly, bus transactions may be monitored for suitable asynchronous transactions. Moreover, whenever a predetermined interval of time elapses without an asynchronous transaction on the bus, timing may be determined by either the ping method or by an asynchronous transaction initiated for that purpose.

The present invention allows timing determinations for IEEE 1394a-2000 systems and networks without necessarily required a bus transaction solely for that purpose. The timing may then be employed to optimize the bus. For example, the timing intervals determined may be employed in setting bus arbitration gap counts.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system for determining transmission delay comprising:

a controller within a first device coupled by an IEEE 1394 serial bus to a second device, the controller for receiving an interval between a first asynchronous transaction request packet and a responsive acknowledgement packet and employing the interval to determine a transmission delay between the first and second devices, the first asynchronous transaction request packet not initiated in order to determine the transmission delay; and the controller further for initiating at least one of a ping packet and a second asynchronous transaction request packet, receiving a response thereto, and determining the transmission delay when the first asynchronous transaction request packet is not detected within a specified amount of time, at least one of the ping packet and the second asynchronous transaction request packet initiated in order to determine the transmission delay.

2. The system according to claim 1, wherein the controller measures the interval.

3. The system according to claim 1, wherein the controller determines the transmission delay between the first and second devices on an opportunistic basis whenever an asynchronous transaction is initiated on the serial bus.

4. The system according to claim 1, wherein the first and second devices are computers.

5. The system according to claim 4, wherein the first and second devices are coupled through intervening nodes on the IEEE 1394 serial bus.

6. The system according to claim 1, wherein the first device is a computer and second device is a peripheral.

7. The system according to claim 1, wherein the controller calculates the interval from the asynchronous transaction request and responsive acknowledgement packets.

8. A system for determining transmission delay comprising:
a first device;
a second device;
an IEEE 1394 serial bus coupling the first and second devices; and
a controller within the first device, the controller for receiving an interval between a first asynchronous transaction request packet and a responsive acknowledgement packet and employing the interval to determine a transmission delay between the first and second devices, the first asynchronous transaction request packet not initiated in order to determine the transmission delay; and
the controller further for initiating at least one of a ping packet and a second asynchronous transaction request packet, receiving a response thereto, and determining the transmission delay when the first asynchronous transaction request packet is not detected within a specified amount of time, at least one of the ping packet and the second asynchronous transaction request packet initiated in order to determine the transmission delay.

9. The system according to claim 8, wherein the controller measures the interval.

10. The system according to claim 8, wherein the controller determines the transmission delay between the first and second devices on an opportunistic basis whenever an asynchronous transaction is initiated on the serial bus.

11. The system according to claim 8, wherein the first and second devices are computers.

12. The system according to claim 11, wherein the first and second devices are coupled through intervening nodes on the IEEE 1394 serial bus.

13. The system according to claim 8, wherein the first device is a computer and second device is a peripheral.

14. The system according to claim 8, wherein the controller calculates the interval from time stamps within the asynchronous transaction request and responsive acknowledgement packets.

15. A method of determining transmission delay between first and second devices coupled by an IEEE 1394 serial bus at a controller, the method comprising:
receiving an interval between a first asynchronous transaction request packet and a responsive acknowledgement packet, the first asynchronous transaction request packet not initiated in order to determine the transmission delay;
employing the interval to determine a transmission delay between the first and second devices; and
initiating at least one of a ping packet and a second asynchronous transaction request packet, receiving a response thereto, and determining the transmission delay when the first asynchronous transaction request packet is not detected within a specified amount of time, at least one of the ping packet and the second asynchronous transaction request packet initiated in order to determine the transmission delay.

16. The method according to claim 15, further comprising:
measuring the interval.

17. The method according to claim 15, further comprising:
determining the transmission delay between the first and second devices on an opportunistic basis whenever an asynchronous transaction is initiated on the serial bus.

18. The method according to claim 15, further comprising:
determining a transmission delay between two computers.

19. The method according to claim 15, further comprising:
determining a transmission delay between two computers coupled through intervening nodes on the IEEE 1394 serial bus.

20. The method according to claim 15, further comprising:
determining a transmission delay between a computer and a peripheral.

21. The system of claim 1, wherein:
the first asynchronous transaction request packet is transmitted from the first device to the second device; and
the responsive acknowledgement packet is transmitted from the second device to the first device.

* * * * *